(12) United States Patent
Iriyama

(10) Patent No.: US 9,402,031 B2
(45) Date of Patent: Jul. 26, 2016

(54) ZOOM LENS AND IMAGE PICKUP APPARATUS HAVING THE SAME

(71) Applicant: CANON KABUSHIKI KAISHA, Tokyo (JP)

(72) Inventor: Yutaka Iriyama, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 14/452,598

(22) Filed: Aug. 6, 2014

(65) Prior Publication Data

US 2015/0042864 A1 Feb. 12, 2015

(30) Foreign Application Priority Data

Aug. 8, 2013 (JP) ................... 2013-164809

(51) Int. Cl.
*G02B 15/14* (2006.01)
*H04N 5/232* (2006.01)
*G02B 13/00* (2006.01)
*G02B 15/177* (2006.01)

(52) U.S. Cl.
CPC .......... *H04N 5/23296* (2013.01); *G02B 13/009* (2013.01); *G02B 15/177* (2013.01)

(58) Field of Classification Search
CPC .... G02B 15/173; G02B 15/177; G02B 15/14; G02B 13/009; G02B 27/646
USPC .......................................... 359/687, 676, 683
See application file for complete search history.

(56) References Cited

U.S. PATENT DOCUMENTS

| 8,988,786 B2* | 3/2015 | Shimomura | ......... G02B 15/173 359/683 |
| 2013/0271850 A1* | 10/2013 | Shimomura | ......... G02B 15/173 359/687 |
| 2014/0049681 A1* | 2/2014 | Shimomura | ........... G02B 15/17 348/345 |
| 2014/0300781 A1* | 10/2014 | Yamasaki | .......... H04N 5/23296 348/240.3 |
| 2016/0004054 A1* | 1/2016 | Kawamura | ........... G02B 15/177 348/240.99 |

FOREIGN PATENT DOCUMENTS

JP H06-242378 A 9/1994
JP 2001-021804 A 1/2001

* cited by examiner

*Primary Examiner* — Bumsuk Won
*Assistant Examiner* — Tamara Y Washington
(74) *Attorney, Agent, or Firm* — Carter, DeLuca, Farrell & Schmidt, LLP

(57) ABSTRACT

A zoom lens includes, in order from the object side, a positive first unit, a zooming lens group constituted by at least two lens units having a zooming function and a function of correcting image plane variation with zooming, and a last lens unit disposed on the most image side having an imaging effect and not moving for zooming. The first unit includes a negative first sub unit not moving for focusing, a second sub unit moving during focusing, and a positive third sub unit not moving for focusing. The first sub unit is composed of one or more concave lenses, and the third sub unit is composed of one or more convex lenses. Of the first and third sub units, the refractive powers, the average Abbe constants and the paraxial converted beam heights at the telephoto end are appropriately set.

4 Claims, 6 Drawing Sheets

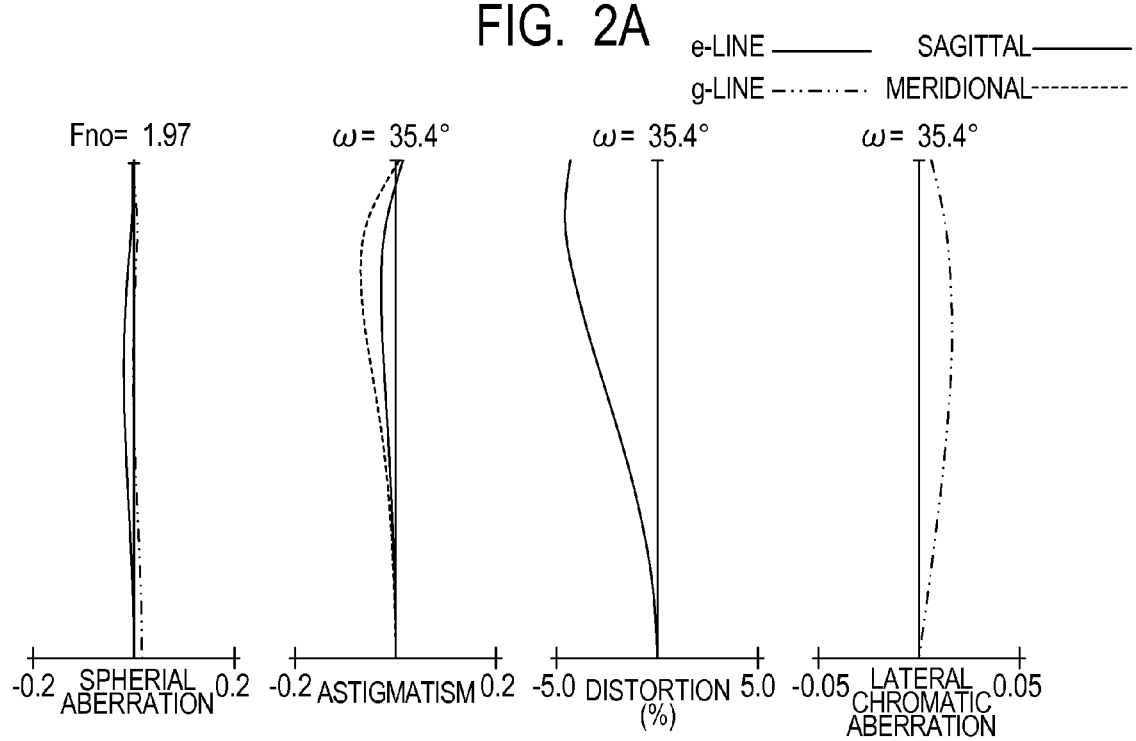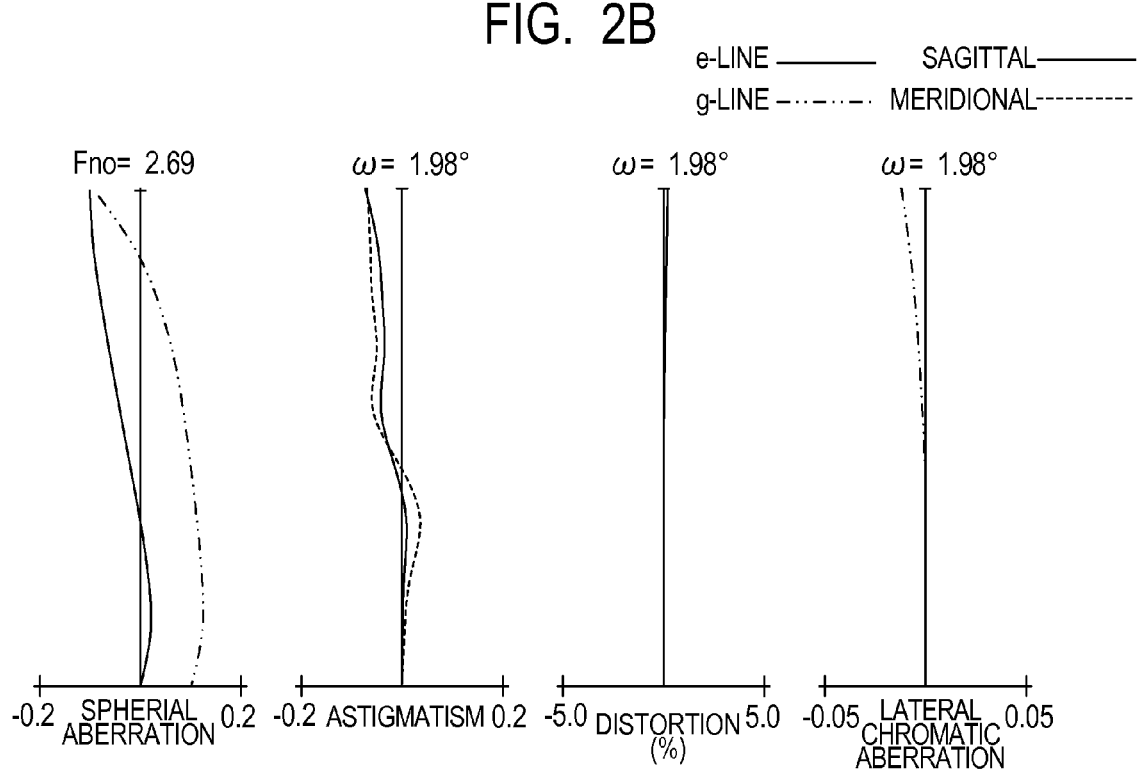

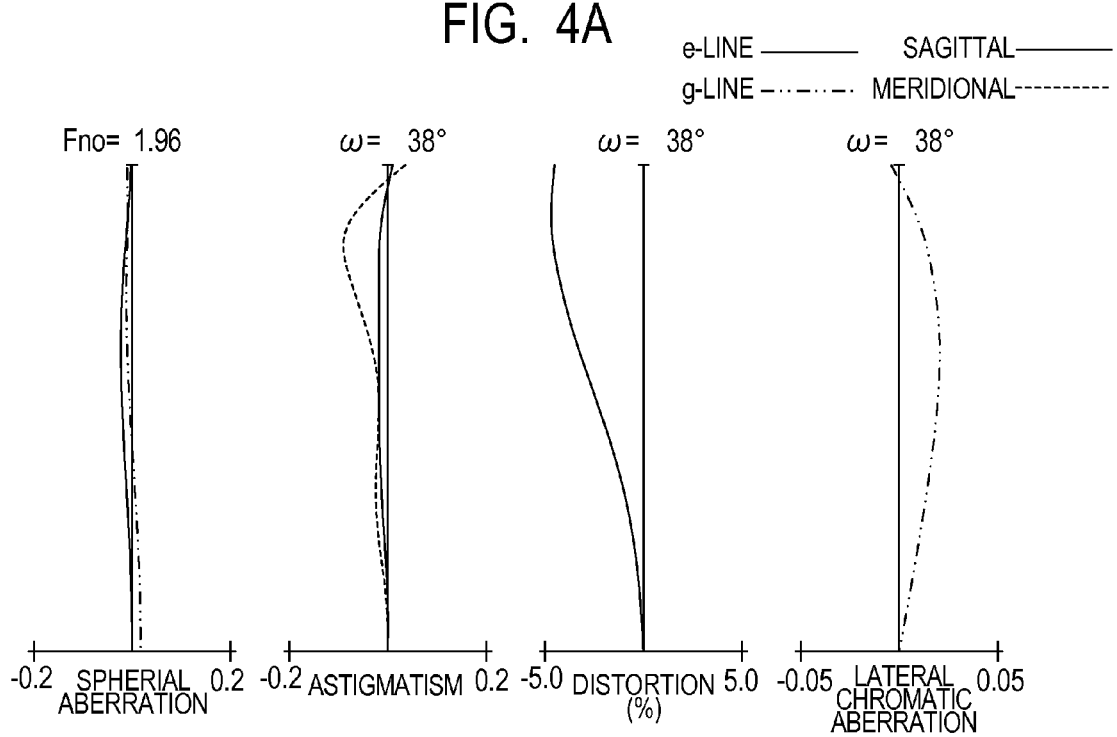
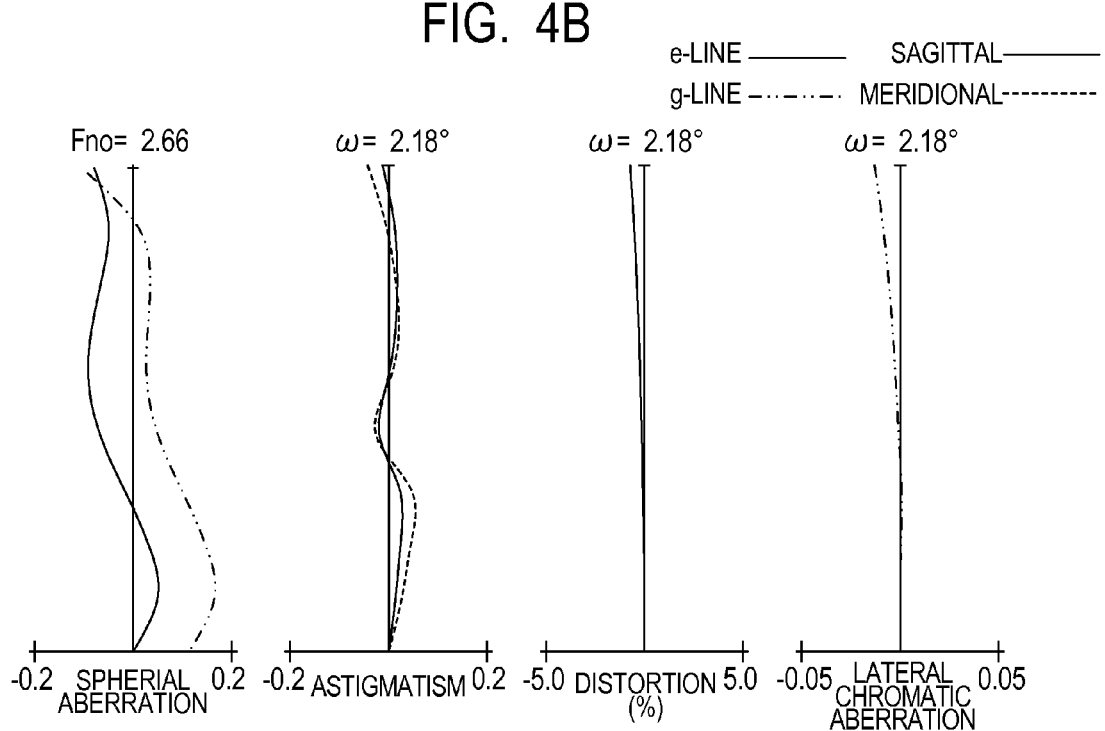

ZOOM LENS AND IMAGE PICKUP APPARATUS HAVING THE SAME

BACKGROUND OF THE INVENTION

1. Field of the Invention

The present invention relates to a zoom lens and more particularly to a zoom lens in which a focusing unit is composed of three sub units and the center sub unit among the three sub units is moved in the direction along the optical axis for focusing. The present invention also relates to an image pickup apparatus having such a zoom lens.

2. Description of the Related Art

There have been demands for reduction of the change in the angle of view with focusing in television cameras and video cameras. As a focusing method in a zoom lens that is preferred to this end, there has been developed a focusing method described below.

In this focusing method, a focus unit is arranged as the first unit, which is composed of three sub units, and the center sub unit among the three sub units is moved in the direction along the optical axis to effect focusing.

With reduction in the overall size of cameras, reduction in the size of lens systems (in particular, the size of front unit of lens systems) is also demanded.

Reference is made by way of example to Japanese Patent Application Laid-Open No. 2001-021804. A zoom lens disclosed in this patent document includes, in order from the object side to the image side, a first lens unit having positive refractive power, a second lens unit for zooming having negative refractive power, a third lens unit that corrects image plane variation with zooming, and a fourth lens unit having an imaging effect that is stationary during zooming. The first lens unit is composed of a first sub unit having negative refractive power that is stationary for focusing, a second sub unit that moves along the optical axis during focusing, and a third sub unit having a positive refractive power that is stationary for focusing. The zoom lens disclosed in this patent document is designed to have high optical performance (with improved distortion correction in particular in the wide angle range) by setting the focal lengths of the first to third sub units and the first lens unit appropriately.

In the prior art disclosed in Japanese Patent Application Laid-Open No. 2001-021804, high performance is achieved throughout the entire zoom range and the entire focus range generally by correcting chromatic aberration on a unit-by-unit basis in a zoom lens having a high zoom ratio equal to or higher than 10. For example, in the first embodiment, chromatic aberration is corrected in each of the first sub unit and the third sub unit independently from each other to reduce overall chromatic aberration of the first lens unit. However, correction of chromatic aberration made on a unit-by-unit basis leads to an increase in the number of lenses constituting the first lens unit, making the size of the first lens unit larger.

SUMMARY OF THE INVENTION

The present invention provides a zoom lens that can be designed to be simple in configuration and small in size while controlling change in the angle of view with focusing.

According to the present invention, there is provided a zoom lens including in order from the object side to the image side: a first lens unit having positive refractive power; a zooming lens unit including at least two sub lens units having a zooming function and a function of correcting image plane variation with zooming; and a last lens unit disposed on the most image side that has an imaging effect and does not move for zooming, wherein the first lens unit includes a first sub lens unit having negative refractive power that does not move for focusing, a second sub lens unit that moves during focusing, and a third sub lens unit having positive refractive power that does not move for focusing, the first sub unit is composed of one or more concave lenses, the third sub lens unit is composed of one or more convex lenses, and the zoom lens satisfies the following condition:

$$-0.6 < \frac{\frac{\phi_{11}}{\phi_{13}}}{\frac{\nu_{11}}{\nu_{13}}} \times \left(\frac{h_{11T}}{h_{13T}}\right)^2 < -0.5,$$

where $\phi_{11}$ is the refractive power of the first sub lens unit, $\phi_{13}$ is the refractive power of the third sub lens unit, $\nu_{11}$ is the average Abbe constant of the first sub lens unit, $\nu_{13}$ is the average Abbe constant of the third sub lens unit, $h_{11T}$ is the paraxial converted beam height of the first sub lens unit at the telephoto end, and $h_{13T}$ is the paraxial converted beam height of the third sub lens unit at the telephoto end.

According to the present invention, there can be provided a zoom lens that can be designed to be simple in the configuration of the first lens unit and small in size while having a three-unit inner-focus type design.

Further features of the present invention will become apparent from the following description of exemplary embodiments with reference to the attached drawings.

BRIEF DESCRIPTION OF THE DRAWINGS

FIG. 2A shows aberration diagrams of the zoom lens according to the first numerical embodiment of the present invention in a state in which the lens is focused at an object distance of 2.5 meters at the wide angle end.

FIG. 2B shows aberration diagrams of the zoom lens according to the first numerical embodiment of the present invention in a state in which the lens is focused at an object distance of 2.5 meters at the telephoto end.

FIG. 4A shows aberration diagrams of the zoom lens according to the second numerical embodiment of the present invention in a state in which the lens is focused at an object distance of 2.5 meters at the wide angle end.

FIG. 4B shows aberration diagrams of the zoom lens according to the second numerical embodiment of the present invention in a state in which the lens is focused at an object distance of 2.5 meters at the telephoto end.

DESCRIPTION OF THE EMBODIMENTS

Preferred embodiments of the present invention will now be described in detail in accordance with the accompanying drawings.

Figure 1:
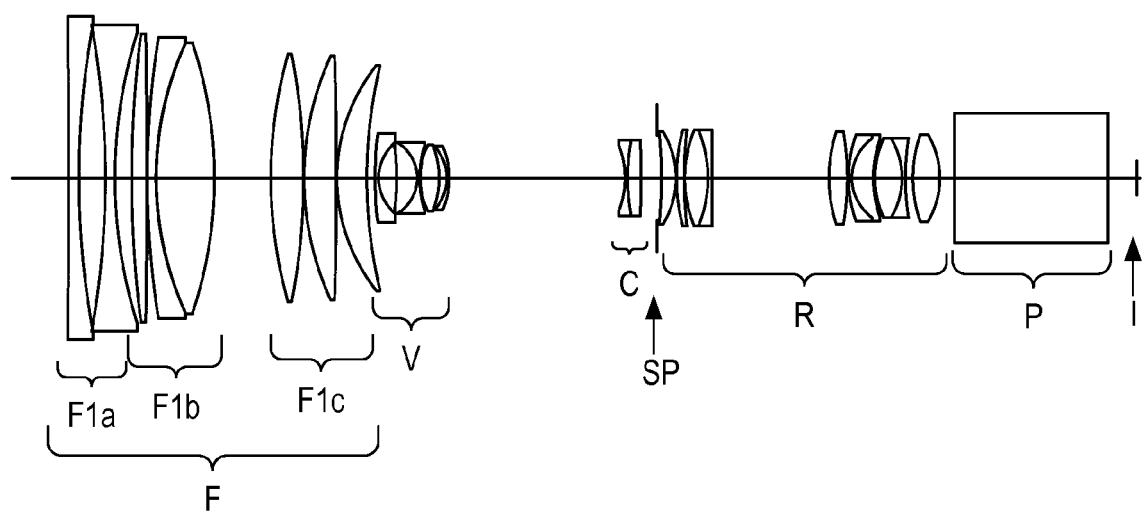
FIG. 1 is a cross sectional view of a lens according to a first numerical embodiment of the present invention in a state in which the lens is focused at infinity at the wide angle end.

FIG. 1 is a cross sectional view of a typical lens according to an embodiment of the present invention. The zoom lens according to this embodiment includes, in order from the object side to the image side, a first lens unit or front lens unit F having positive refractive power that does not move in the direction along the optical axis for zooming, a zooming lens group that has both a zooming function and a function of correcting image plane variation, a stop SP, and a last lens unit serving as a relay lens unit R having positive refractive power that does not move in the direction along the optical axis for zooming and has an imaging effect. The last lens unit is a lens unit disposed on the most image side among the lens units constituting the zoom lens. FIG. 1 also shows a glass block P representing a color separating prism and an optical filter and the image plane I of an image pickup element, which are arranged in a camera apparatus to which the zoom lens according to the present invention is connected. Light coming from an object through the zoom lens is received by the image pickup element. Thus, the zoom lens according to the present invention and the camera apparatus constitute an image pickup apparatus.

The first lens unit F includes, in order from the object side to the image side, an F1a lens unit (or first sub lens unit) that does not move in the direction along the optical axis for focusing, an F1b lens unit (or second sub lens unit) that moves in the direction along the optical axis during focusing, and an F1c lens unit (or third sub lens unit) that does not move in the direction along the optical axis for focusing.

The zooming lens group includes, in order from the object side to the image side, a variator lens unit V having negative refractive power that moves during zooming and a compensator lens unit C having negative refractive power. The variator lens unit V moves along the optical axis monotonously toward the image plane to effect zooming from the wide angle end to the telephoto end. The compensator lens unit C moves along the optical axis non-linearly to correct image plane variation with zooming.

The F1a lens unit (or first sub lens unit) includes only negative lenses (concave lenses). The F1c lens unit (or third sub lens unit) includes only positive lenses (convex lenses). Including only negative or positive lenses respectively, each of these lens units generates chromatic aberration by itself. However, the F1a lens unit and the F1c lens unit generate opposite chromatic aberrations, and overall aberration of the first lens unit is excellently corrected.

The zoom lens according to the present invention satisfies the following condition:

$$-0.6 < \frac{\frac{\phi_{11}}{\phi_{13}}}{\frac{\nu_{11}}{\nu_{13}}} \times \left(\frac{h_{11T}}{h_{13T}}\right)^2 < -0.5, \tag{1}$$

where $\phi_{11}$ is the refractive power of the F1a lens unit (first sub lens unit), $\phi_{13}$ is the refractive power of the F1c lens unit (third sub lens unit), $\nu_{11}$ is the average Abbe constant of the F1a lens unit (first sub lens unit), $\nu_{13}$ is the average Abbe constant of the F1c lens unit (third sub lens unit), $h_{11T}$ is the paraxial converted beam height of the F1a lens unit (first sub lens unit) at the telephoto end (the telephoto end paraxial converted beam height of the F1a lens unit), and $h_{11T}$ is the paraxial converted beam height of the F1c lens unit (third sub lens unit) at the telephoto end (the telephoto end paraxial converted beam height of the F1c lens unit).

The above conditional expression (1) is derived from a condition for cancelling chromatic aberrations of the first sub lens unit (F1a lens unit) and the third sub lens unit (F1c lens unit) in the first lens unit. If the lower limit of this condition is not satisfied, large axial chromatic aberration in which the focus position for g-line is displaced to the image side (or over side) from the focus position for e-line will result, particularly at the telephoto end. On the other hand, if the upper limit of this condition is not satisfied, large axial chromatic aberration in which the focus position for g-line is displaced to the object side (or under side) from the focus position for e-line will result, particularly at the telephoto end.

The zoom lens according to the present invention satisfies the following condition:

$$0.20 < \frac{\phi_{12}}{\phi_1} < 0.30, \tag{2}$$

where $\phi_1$ is the refractive power of the first lens unit, and $\phi_{12}$ is the refractive power of the second sub lens unit.

The above conditional expression (2) limits the value of the ratio of the refractive power of the first lens unit (first lens unit F) to the refractive power of the second sub lens unit (F1b lens unit), which relates to the amount of shift of the second sub lens unit (F1b lens unit), which is the lens unit that moves during focusing. If the upper limit of this condition is not satisfied, the refractive power of the F1b lens unit is too high, leading to large aberration variation with focusing. If the lower limit of this condition is not satisfied, the refractive power of the F1b lens unit is too low, necessitating a large amount of shift of the F1b lens unit in the direction along the optical axis for focusing and leading to an increase in the size of the first lens unit.

The zoom lens according to the present invention satisfies the following condition:

$$1.1 < \frac{fw}{hgt} < 1.5, \tag{3}$$

where fw is the focal length of the zoom lens at the wide angle end, and hgt is the maximum image height.

The above conditional expression (3) limits the focal length of the zoom lens at the wide angle end. Generally speaking, the shorter the focal length at the wide angle end is, the higher the refractive powers of sub lens units in the first lens unit in the three-unit inner-focus system are. If the lower limit of this condition is not satisfied, the refractive powers of the sub lens units in the first lens unit are too high, leading to increased distortion. If the upper limit of this condition is not satisfied, the refractive powers of the sub lens units in the first lens unit are too low, leading to a decrease in the advantageous effect of the three-unit inner-focus system in reducing the change in the angle of view during focusing.

First Embodiment

In the following, a zoom lens according to a first embodiment of the present invention will be described with reference to FIGS. 1, 2A, and 2B. This zoom lens has a basic lens unit configuration as described above. In this embodiment, the first lens unit includes the 1st through 17th surfaces. The first lens unit is composed of an F1a lens unit including 1st through 4th surfaces, an F1b lens unit including 5th through 10th surfaces, and an F1c lens unit including 11th through 16th surfaces. The F1a lens unit is composed only of negative lenses. The F1c lens unit is composed only of positive lenses. Including only negative/positive lenses, each of these lens units generates chromatic aberration by itself. However, the F1a lens unit and the F1c lens unit generate opposite chromatic aberrations, and overall aberration of the first lens unit is excellently corrected.

In this embodiment, the value of the term defined in conditional expression (1) is −0.535. The paraxial converted beam height mentioned in connection with conditional expression (1) is a paraxial traced value, which is normalized by the focal length of the entire lens system at the wide angle end with the beam height equal to the incident beam height on the first lens surface at the wide angle end being expressed as 1 (unity). Note that the term "beam" refers to beam, among axial beams, passing through a position most away from the optical axis and that the term "paraxial converted beam height of the lens unit" refers to the "paraxial converted beam height" at a lens surface on the most object side among lens surfaces of the lens unit. In this embodiment, the value of the term defined in conditional expression (1) satisfies the lower limit. Consequently, axial chromatic aberration in which the focus position for g-line is displaced to the image side (or over side) from the focus position for e-line is excellently corrected particularly at the telephoto end. In this embodiment, the value of the term defined in conditional expression (2) is 0.246, which satisfies conditional expression (2) in terms of its upper and lower limits. Consequently, the amount of shift of the F1b lens unit that moves in the direction along the optical axis during focusing is excellently controlled. Therefore, an increase in the size of the first lens unit is prevented while controlling aberration variation. In this embodiment, the value of the term defined in conditional expression (3) is 1.409, which satisfies conditional expression (3) in terms of its upper limit. Therefore, the focal length range of the zoom lens is not biased to longer focal lengths, and the sub lens units in the first lens unit have sufficiently high refractive powers, allowing reduction of the change in the angle of view with focusing.

FIGS. 2A and 2B show longitudinal aberrations in the zoom lens of this embodiment. FIG. 2A shows aberrations at the wide angle end, and FIG. 2B shows aberrations at the telephoto end. The longitudinal aberration diagrams in FIGS. 2A and 2B are for an object distance of 2.5 meters. Since the zoom lens satisfies conditional expressions (1) to (3), axial chromatic aberration is well corrected particularly.

Second Embodiment

Figure 3:
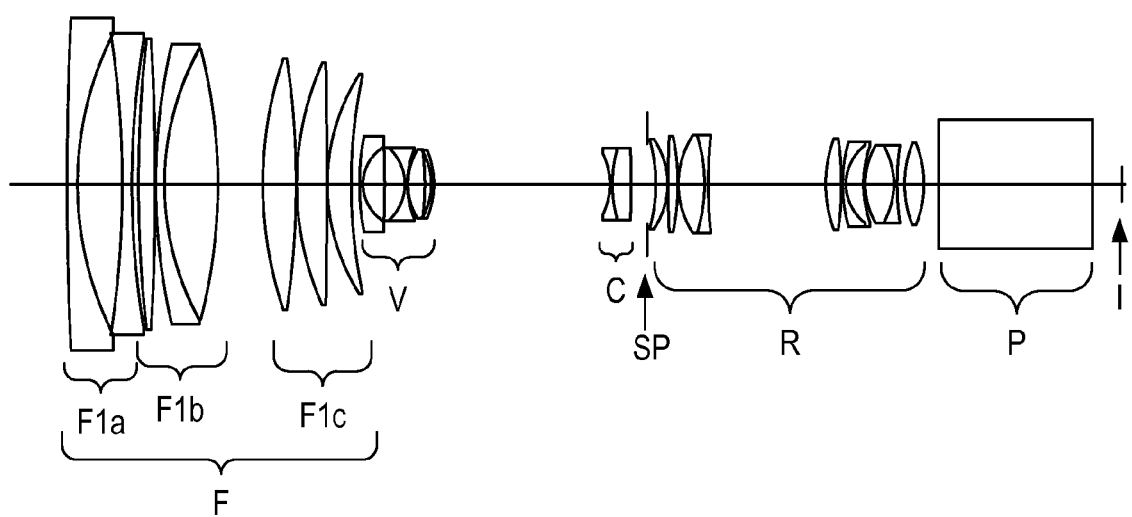
FIG. 3 is a cross sectional view of a lens according to a second numerical embodiment of the present invention in a state in which the lens is focused at infinity at the wide angle end.

In the following, a zoom lens according to a second embodiment of the present invention will be described with reference to FIGS. 3, 4A, and 4B. The basic lens unit configuration is the same as that in the above-described first embodiment. FIG. 3 is a cross sectional view of the zoom lens according to this embodiment at an infinite object distance at the wide angle end. The F1a lens unit is composed only of negative lenses. The F1c lens unit is composed only of positive lenses. Including only negative/positive lenses, each of these lens units generates chromatic aberration by itself. However, the F1a lens unit and the F1c lens unit generate opposite chromatic aberrations, and overall aberration of the first lens unit is excellently corrected.

In this embodiment, the value of the term defined in conditional expression (1) is −0.526, which satisfies conditional expression (1) in terms of its upper limit. Consequently, axial chromatic aberration in which the focus position for g-line is displaced to the object side (or under side) from the focus position for e-line is excellently corrected particularly at the telephoto end. In this embodiment, the value of the term defined in conditional expression (2) is 0.268, which satisfies conditional expression (2) in terms of its upper and lower limits. Consequently, the amount of shift of the F1b lens unit that moves in the direction along the optical axis during focusing is excellently controlled. Therefore, an increase in the size of the first lens unit is prevented while controlling aberration variation. In this embodiment, the value of the term defined in conditional expression (3) is 1.281, which satisfies conditional expression (3) in terms of its lower limit. Therefore, the focal length range of the zoom lens is not biased to shorter focal lengths, and the refractive powers of the sub lens units in the first lens unit are not so high, allowing excellent correction of distortion.

FIGS. 4A and 4B show longitudinal aberrations in the zoom lens of this embodiment. FIG. 4A shows aberrations at the wide angle end, and FIG. 4B shows aberrations at the telephoto end. The longitudinal aberration diagrams in FIGS. 4A and 4B are for an object distance of 2.5 meters. Since the zoom lens satisfies conditional expressions (1) to (3), axial chromatic aberration is excellently corrected.

Third Embodiment

Figure 5:
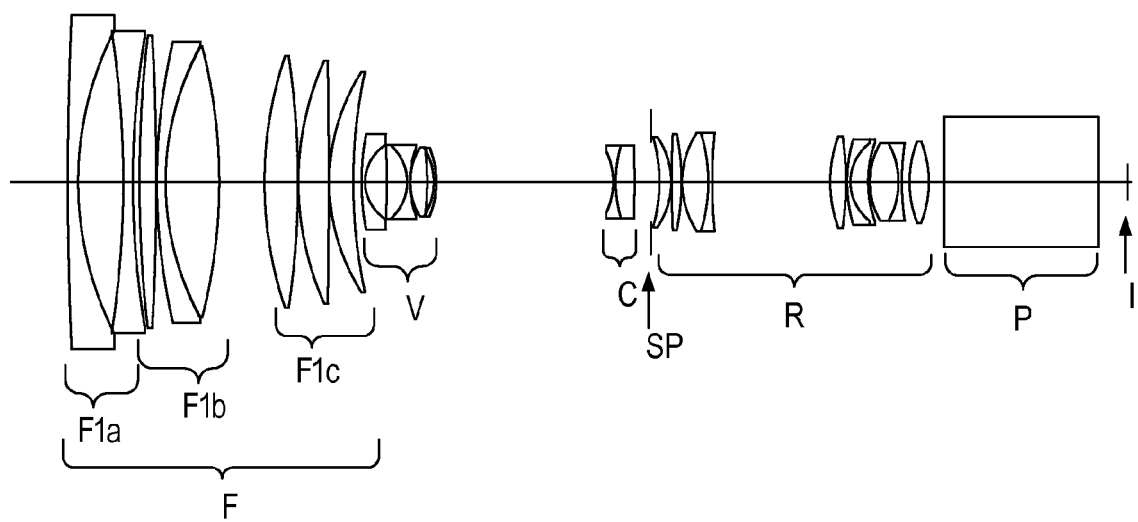
FIG. 5 is a cross sectional view of a lens according to a third numerical embodiment of the present invention in a state in which the lens is focused at infinity at the wide angle end.

In the following, a zoom lens according to a third embodiment of the present invention will be described with reference to FIGS. 5, 6A and 6B. The basic lens unit configuration is the same as that in the above-described first embodiment. FIG. 5 is a cross sectional view of the zoom lens according to this embodiment at an infinite object distance at the wide angle end. The F1a lens unit is composed only of negative lenses. The F1c lens unit is composed only of positive lenses. Including only negative/positive lenses, each of these lens units generates chromatic aberration by itself. However, the F1a lens unit and the F1b lens unit generate opposite chromatic aberrations, and overall aberration of the first lens unit is excellently corrected.

In this embodiment, the value of the term defined in conditional expression (1) is −0.596, which satisfies conditional expression (1) in terms of its lower limit. Consequently, axial chromatic aberration in which the focus position for g-line is displaced to the object side (or under side) from the focus position for e-line is excellently corrected particularly at the telephoto end. In this embodiment, the value of the term defined in conditional expression (2) is 0.237, which satisfies conditional expression (2) in terms of its upper and lower limits. Consequently, the amount of shift of the F1b lens unit that moves in the direction along the optical axis during focusing is excellently controlled. Therefore, an increase in the size of the first lens unit is prevented while controlling aberration variation. In this embodiment, the value of the term defined in conditional expression (3) is 1.409, which satisfies conditional expression (3) in terms of its upper limit. Therefore, the focal length range of the zoom lens is not biased to shorter focal lengths, and the refractive powers of the sub lens units in the first lens unit are not so high, allowing excellent correction of distortion.

Figure 6A:
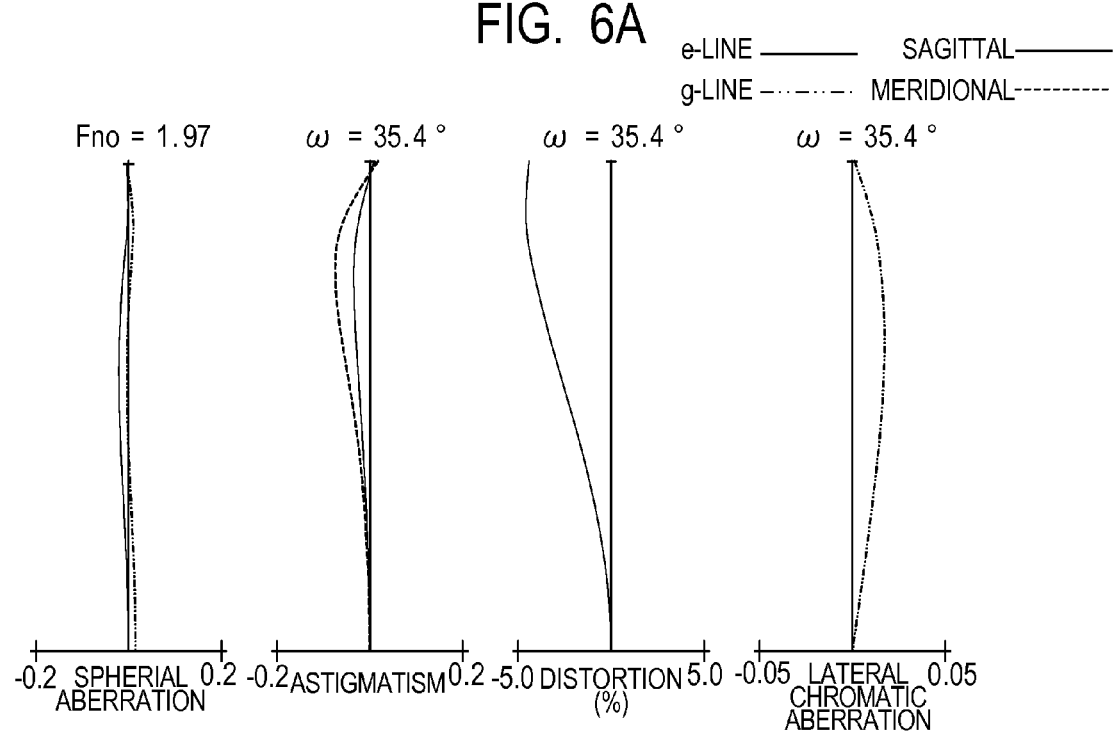
FIG. 6A shows aberration diagrams of the zoom lens according to the third numerical embodiment of the present invention in a state in which the lens is focused at an object distance of 2.5 meters at the wide angle end.
Figure 6B:
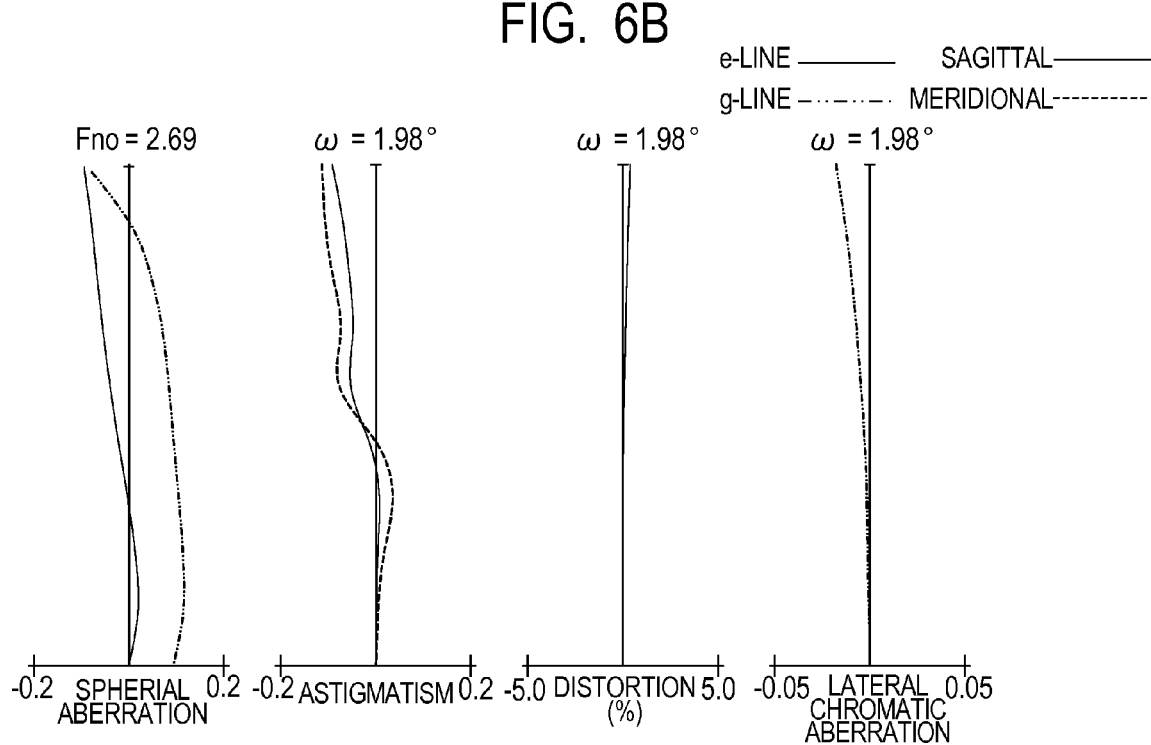
FIG. 6B shows aberration diagrams of the zoom lens according to the third numerical embodiment of the present invention in a state in which the lens is focused at an object distance of 2.5 meters at the telephoto end.

FIGS. 6A and 6B show longitudinal aberrations in the zoom lens of this embodiment. FIG. 6A shows aberrations at the wide angle end, and FIG. 6B shows aberrations at the telephoto end. The longitudinal aberration diagrams in FIGS.

6A and 6B are for an object distance of 2.5 meters. Since the zoom lens satisfies conditional expressions (1) to (3), axial chromatic aberration is excellently corrected.

While preferred embodiments of the present invention have been described, the present invention is not limited to these embodiments, but various modification and changes can be made to them within the essential scope of the present invention. For example, no aspheric surfaces are used in the first lens unit in the present invention, use of aspheric surface is advantageous in reducing aberrations such as spherical aberration, curvature of field, and distortion.

Values relating to conditional expressions (1) to (3) are presented in Table 1 below for each of the embodiments.

TABLE 1

|  | φ11 | φ12 | φ13 | ν11 | ν13 | φ1 | h11T | h13T | Cond. 1 | Cond. 2 | Cond. 3 |
|---|---|---|---|---|---|---|---|---|---|---|---|
| Emb. 1 | −0.00920 | 0.00390 | 0.01546 | 54.84 | 86.17 | 0.01586 | 20.51 | 27.12 | −0.535 | 0.246 | 1.409 |
| Emb. 2 | −0.01075 | 0.00417 | 0.01558 | 54.08 | 77.13 | 0.01560 | 20.51 | 28.05 | −0.526 | 0.268 | 1.281 |
| Emb. 3 | −0.00920 | 0.00390 | 0.01546 | 52.14 | 86.17 | 0.01642 | 20.51 | 26.35 | −0.596 | 0.237 | 1.409 |

In the following, numerical embodiments corresponding to the first and second embodiments of the present invention will be described. In the numerical embodiments, there are presented the surface number i counted from the object side, the radius of curvature $r_i$ of the i-th surface counted from the object side, the distance di between the i-th surface and the (i+1)-th surface, the refractive index $N_{di}$ of the i-th optical member, and the Abbe constant $v_{di}$ of the i-th optical member. The last three surfaces are surfaces in the glass block such as a filter.

The aspheric surface shapes are expressed by the following equation in a coordinate system with an X axis taken along the direction of the optical axis with its positive direction directed in the direction of propagation of rays and an H axis taken along a direction perpendicular to the optical axis:

$$X = \frac{H^2/R}{1+\sqrt{1-(1+k)(H/R)^2}} + A_4 \cdot H^4 + A_6 \cdot H^6 + A_8 \cdot H^8 + A_{10} \cdot H^{10} + A_{12} \cdot H^{12} + A_3 \cdot H^3 + A_5 \cdot H^5 + A_7 \cdot H^7 + A_9 \cdot H^9 + A_{11} \cdot H^{11}$$

where R is the paraxial curvature radius, k is a conic constant, and $A_3, A_4, A_5, A_6, A_7, A_8, A_9, A_{10}, A_{11}$, and $A_{12}$ are aspheric coefficients.

In the following data, expression "e-Z" stands for "×$10^{-Z}$". The aspheric lens surfaces are indicated by asterisk * suffixed to their surface numbers.

Numerical Embodiment 1

Lengths in the following table are in millimeters.

Surface Data

| i | $r_i$ | $d_i$ | $nd_i$ | $vd_i$ |
|---|---|---|---|---|
| 1 | −4582.019 | 3.12 | 1.77250 | 49.6 |
| 2 | 285.861 | 7.94 | | |
| 3 | −291.035 | 2.90 | 1.64000 | 60.1 |
| 4 | 163.670 | 5.06 | | |
| 5 | 384.779 | 4.53 | 1.59240 | 68.3 |
| 6 | −3148.795 | 0.15 | | |
| 7 | 301.105 | 2.60 | 1.80518 | 25.4 |
| 8 | 108.596 | 0.13 | | |
| 9 | 109.985 | 17.48 | 1.43387 | 95.1 |
| 10 | −143.309 | 16.99 | | |
| 11 | 153.806 | 9.85 | 1.43387 | 95.1 |
| 12 | −219.325 | 0.15 | | |
| 13 | 98.446 | 9.74 | 1.43387 | 95.1 |
| 14 | −1360.889 | 0.15 | | |
| 15 | 60.321 | 9.00 | 1.59240 | 68.3 |
| 16 | 162.713 | (variable) | | |
| 17* | 361.700 | 1.00 | 1.88300 | 40.8 |
| 18 | 15.330 | 5.44 | | |
| 19 | −91.257 | 6.22 | 1.80809 | 22.8 |
| 20 | −13.763 | 0.75 | 1.81600 | 46.6 |
| 21 | 38.647 | 0.15 | | |
| 22* | 27.098 | 5.67 | 1.56732 | 42.8 |
| 23 | −29.387 | 2.34 | | |
| 24 | −15.582 | 0.75 | 1.88300 | 40.8 |
| 25 | −26.648 | (variable) | | |
| 26 | −29.548 | 0.75 | 1.81600 | 46.6 |
| 27 | 66.816 | 4.02 | 1.92286 | 21.3 |
| 28 | −339.887 | (variable) | | |
| 29 (stop) | ∞ | 1.30 | | |
| 30 | −146.687 | 4.40 | 1.67003 | 47.2 |
| 31 | −29.728 | 0.14 | | |
| 32 | 62.326 | 2.32 | 1.51823 | 58.9 |
| 33 | 149.762 | 0.16 | | |
| 34 | 42.430 | 6.99 | 1.48749 | 70.2 |
| 35 | −42.419 | 1.15 | 1.88300 | 40.8 |
| 36 | 1125.326 | (variable) | | |
| 37 | 50.594 | 5.53 | 1.48749 | 70.2 |
| 38 | −90.635 | 0.36 | | |
| 39 | 43.081 | 1.00 | 1.88300 | 40.8 |
| 40 | 16.130 | 6.47 | 1.50127 | 56.5 |
| 41 | 40.000 | 0.50 | | |
| 42 | 31.955 | 8.14 | 1.50127 | 56.5 |
| 43 | −25.916 | 1.00 | 1.88300 | 40.8 |
| 44 | 84.109 | 2.28 | | |
| 45 | 44.649 | 8.10 | 1.51633 | 64.1 |
| 46 | −28.738 | 4.50 | | |
| 47 | ∞ | 33.00 | 1.60859 | 46.4 |
| 48 | ∞ | 13.20 | 1.51633 | 64.2 |
| 49 | ∞ | (variable) | | |
| image plane | ∞ | | | |

Aspheric Surface Data

17th surface

K = −1.42317e+003  $A_4$ = 2.42691e−005  $A_6$ = 2.07125e−008
$A_8$ = −2.99279e−010  $A_{10}$ = 1.82448e−012  $A_{12}$ = −5.10871e−015
$A_3$ = −1.70244e−005  $A_5$ = −8.87838e−007  $A_7$ = 3.54916e−009
$A_9$ = −2.03856e−011  $A_{11}$ = 6.48534e−014

22nd surface

K = 1.16467e+000  $A_4$ = 4.03194e−010  $A_6$ = −6.72369e−008
$A_8$ = −6.80698e−010  $A_{10}$ = −1.01218e−012  $A_{12}$ = 6.22703e−014
$A_3$ = 1.52428e−005  $A_5$ = 6.95654e−007  $A_7$ = 3.41581e−009
$A_9$ = 1.26150e−010  $A_{11}$ = −1.04016e−012

Various Data
Zoom Ratio 20.51

|  | Wide Angle End | Telephoto End |
|---|---|---|
| Focal Length | 7.75 | 158.92 |
| F-Number | 1.97 | 2.69 |

-continued

| | | |
|---|---|---|
| Field Angle | 35.37 | 1.98 |
| Image Height | 5.50 | 5.50 |
| OLL | 304.60 | 304.60 |
| BF | 42.24 | 42.24 |
| d16 | 2.54 | 53.69 |
| d25 | 52.94 | 5.33 |
| d28 | 4.85 | 1.30 |
| d36 | 35.30 | 35.30 |
| d53 | 8.57 | 8.57 |

(OLL: overall lens length)

Zoom Lens Unit Data

| Unit | Leading Surface | Focal Length |
|---|---|---|
| 1 | 1 | 63.05 |
| 2 | 17 | −13.32 |
| 3 | 26 | −43.25 |
| 4 | 29 | 37.95 |
| 5 | 37 | 54.43 |

Numerical Embodiment 2

Lengths in the following table are in millimeters.

Surface Data

| i | $r_i$ | $d_i$ | $nd_i$ | $vd_i$ |
|---|---|---|---|---|
| 1 | 1194.450 | 3.12 | 1.77250 | 49.6 |
| 2 | 112.481 | 13.49 | | |
| 3 | −334.782 | 2.90 | 1.65160 | 58.5 |
| 4 | 301.055 | 1.97 | | |
| 5 | 441.900 | 5.05 | 1.59240 | 68.3 |
| 6 | −842.408 | 0.15 | | |
| 7 | 209.957 | 2.60 | 1.80518 | 25.4 |
| 8 | 93.895 | 0.01 | | |
| 9 | 94.932 | 16.05 | 1.43387 | 95.1 |
| 10 | −183.219 | 13.52 | | |
| 11 | 132.762 | 10.02 | 1.49700 | 81.5 |
| 12 | −285.489 | 0.15 | | |
| 13 | 100.470 | 9.07 | 1.49700 | 81.5 |
| 14 | −2554.965 | 0.15 | | |
| 15 | 68.389 | 7.17 | 1.59240 | 68.3 |
| 16 | 175.995 | (variable) | | |
| 17* | 107.958 | 1.00 | 1.88300 | 40.8 |
| 18 | 14.421 | 6.54 | | |
| 19 | −296.369 | 6.09 | 1.80809 | 22.8 |
| 20 | −16.279 | 0.75 | 1.81600 | 46.6 |
| 21 | 30.719 | 0.15 | | |
| 22* | 22.301 | 5.08 | 1.56732 | 42.8 |
| 23 | −93.933 | 1.98 | | |
| 24 | −21.871 | 0.75 | 1.88300 | 40.8 |
| 25 | −30.039 | (variable) | | |
| 26 | −23.373 | 0.75 | 1.81600 | 46.6 |
| 27 | 42.703 | 5.60 | 1.92286 | 21.3 |
| 28 | −458.479 | (variable) | | |
| 29 (stop) | ∞ | 2.61 | | |
| 30 | −55.114 | 3.56 | 1.67003 | 47.2 |
| 31 | −26.632 | 0.14 | | |
| 32 | 351.716 | 2.93 | 1.51823 | 58.9 |
| 33 | −80.871 | 0.16 | | |
| 34 | 29.912 | 7.86 | 1.48749 | 70.2 |
| 35 | −55.456 | 1.15 | 1.88300 | 40.8 |
| 36 | 160.247 | (variable) | | |
| 37 | 44.613 | 4.71 | 1.48749 | 70.2 |
| 38 | −111.831 | 0.36 | | |
| 39 | 50.873 | 1.00 | 1.88300 | 40.8 |
| 40 | 16.238 | 5.29 | 1.50127 | 56.5 |
| 41 | 39.243 | 0.50 | | |
| 42 | 25.828 | 8.61 | 1.50127 | 56.5 |
| 43 | −26.295 | 1.00 | 1.88300 | 40.8 |
| 44 | 90.978 | 2.28 | | |
| 45 | 37.565 | 5.80 | 1.51633 | 64.1 |
| 46 | −36.614 | 4.50 | | |
| 47 | ∞ | 33.00 | 1.60859 | 46.4 |
| 48 | ∞ | 13.20 | 1.51633 | 64.2 |
| 49 | ∞ | (variable) | | |
| image plane | ∞ | | | |

Aspheric Surface Data

17th surface $K = -7.63987e+001$    $A_4 = 2.62542e-005$    $A_6 = -1.13423e-007$
$A_8 = 1.10827e-009$    $A_{10} = 5.14167e-012$    $A_{12} = -5.10871e-015$
$A_3 = -2.77621e-005$    $A_5 = -7.26026e-007$    $A_7 = 7.26327e-009$
$A_9 = -1.52458e-010$    $A_{11} = 7.03323e-014$ 22nd surface $K = 1.11886e+000$    $A_4 = -1.31685e-005$    $A_6 = -1.29506e-007$
$A_8 = -5.69300e-010$    $A_{10} = -9.29069e-012$    $A_{12} = 6.22703e-014$
$A_3 = 9.95598e-006$    $A_5 = 1.85904e-007$    $A_7 = 4.01663e-009$
$A_9 = 2.18516e-010$    $A_{11} = -1.19397e-012$ Various Data
Zoom Ratio 20.51

| | Wide Angle End | Telephoto End |
|---|---|---|
| Focal Length | 7.05 | 144.55 |
| F-Number | 1.96 | 2.66 |
| Field Angle | 37.97 | 2.18 |
| Image Height | 5.50 | 5.50 |
| OLL | 300.15 | 300.15 |
| BF | 42.47 | 42.47 |
| d16 | 2.54 | 57.90 |
| d25 | 52.94 | 1.27 |
| d28 | 4.85 | 1.16 |
| d36 | 35.30 | 35.30 |
| d49 | 8.80 | 8.80 |

Zoom Lens Unit Data

| Unit | Leading Surface | Focal Length |
|---|---|---|
| 1 | 1 | 64.11 |
| 2 | 17 | −14.96 |
| 3 | 26 | −33.16 |
| 4 | 29 | 35.87 |
| 5 | 37 | 54.20 |

Numerical Embodiment 3

Lengths in the following table are in millimeters.

Surface data

| i | $r_i$ | $d_i$ | $nd_i$ | $vd_i$ |
|---|---|---|---|---|
| 1 | 618.272 | 3.12 | 1.77250 | 49.6 |
| 2 | 268.195 | 9.22 | | |
| 3 | −243.963 | 2.90 | 1.72916 | 54.7 |
| 4 | 165.206 | 4.69 | | |
| 5 | 377.223 | 3.99 | 1.59240 | 68.3 |
| 6 | 3039.845 | 0.15 | | |
| 7 | 311.245 | 2.60 | 1.80518 | 25.4 |
| 8 | 109.887 | 0.14 | | |
| 9 | 111.310 | 18.71 | 1.43387 | 95.1 |
| 10 | −126.977 | 17.14 | | |
| 11 | 153.621 | 10.69 | 1.43387 | 95.1 |
| 12 | −221.326 | 0.15 | | |
| 13 | 102.545 | 9.38 | 1.43387 | 95.1 |
| 14 | −1316.484 | 0.15 | | |
| 15 | 60.755 | 9.18 | 1.59240 | 68.3 |
| 16 | 176.800 | (variable) | | |
| 17* | 361.700 | 1.00 | 1.88300 | 40.8 |

-continued

| 18 | 14.966 | 5.21 | | |
| 19 | −118.039 | 6.26 | 1.80809 | 22.8 |
| 20 | −13.699 | 0.75 | 1.81600 | 46.6 |
| 21 | 39.355 | 0.15 | | |
| 22* | 26.603 | 5.93 | 1.56732 | 42.8 |
| 23 | −25.968 | 1.60 | | |
| 24 | −16.283 | 0.75 | 1.88300 | 40.8 |
| 25 | −33.075 | (variable) | | |
| 26 | −29.385 | 0.75 | 1.81600 | 46.6 |
| 27 | 66.924 | 3.35 | 1.92286 | 21.3 |
| 28 | −319.994 | (variable) | | |
| 29(stop) | ∞ | 1.30 | | |
| 30 | −122.588 | 4.44 | 1.67003 | 47.2 |
| 31 | −28.009 | 0.14 | | |
| 32 | 49.505 | 2.66 | 1.51823 | 58.9 |
| 33 | 131.912 | 0.16 | | |
| 34 | 62.202 | 6.63 | 1.48749 | 70.2 |
| 35 | −34.332 | 1.15 | 1.88300 | 40.8 |
| 36 | −284.953 | (variable) | | |
| 37 | 59.025 | 5.85 | 1.48749 | 70.2 |
| 38 | −63.677 | 0.36 | | |
| 39 | 47.640 | 1.00 | 1.88300 | 40.8 |
| 40 | 16.573 | 6.34 | 1.50127 | 56.5 |
| 41 | 40.000 | 0.50 | | |
| 42 | 30.068 | 8.38 | 1.50127 | 56.5 |
| 43 | −27.100 | 1.00 | 1.88300 | 40.8 |
| 44 | 81.336 | 2.28 | | |
| 45 | 43.574 | 6.86 | 1.51633 | 64.1 |
| 46 | −30.581 | 4.50 | | |
| 47 | ∞ | 33.00 | 1.60859 | 46.4 |
| 48 | ∞ | 13.20 | 1.51633 | 64.2 |
| 49 | ∞ | (variable) | | |
| image plane | ∞ | | | |

Aspheric Surface Data

17th surface

K = −1.42317e+003    A₄ = 2.42691e−005    A₆ = 2.07125e−008
A₈ = −2.99279e−010   A₁₀ = 1.82448e−012   A₁₂ = −5.10871e−015
A₃ = −1.70244e−005   A₅ = −8.87838e−007   A₇ = 3.54916e−009
A₉ = −2.03856e−011   A₁₁ = 6.48534e−014

22th surface

K = 1.16467e+000     A₄ = 4.03194e−010    A₆ = −6.72369e−008
A₈ = −6.80698e−010   A₁₀ = −1.01218e−012  A₁₂ = 6.22703e−014
A₃ = 1.52428e−005    A₅ = 6.95654e−007    A₇ = 3.41581e−009
A₉ = 1.26150e−010    A₁₁ = −1.04016e−012

Various Data
Zoom Ratio 20.51

| | Wide Angle | Telephoto |
|---|---|---|
| Focal Length | 7.75 | 158.92 |
| F-Number | 1.97 | 2.69 |
| Field Angle | 35.37 | 1.98 |
| Image Height | 5.50 | 5.50 |
| OLL | 322.62 | 322.62 |
| BF | 8.57 | 8.57 |
| d20 | 2.65 | 53.80 |
| d29 | 53.55 | 5.94 |
| d32 | 4.85 | 1.30 |
| d40 | 35.30 | 35.30 |
| d53 | 8.57 | 8.57 |

(OLL: overall lens length)

Zoom Lens Unit Data

| Unit | Leading Surface | Focal Length |
|---|---|---|
| 1 | 1 | 63.05 |
| 2 | 21 | −13.32 |
| 3 | 30 | −43.25 |
| 4 | 33 | 37.95 |
| 5 | 41 | 54.46 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-164809, filed Aug. 8, 2013, which is hereby incorporated by reference herein in its entirety.

What is claimed is:

1. A zoom lens comprising, in order from the object side to the image side:
    a first lens unit having positive refractive power;
    a zoom lens group constituted by at least two lens units which move during zooming; and
    a last lens unit disposed on the most image side that does not move for zooming,
    wherein the first lens unit includes a first sub lens unit having negative refractive power that does not move for focusing, a second sub lens unit that moves during focusing, and a third sub lens unit having positive refractive power that does not move for focusing,
    the first sub unit is composed of one or more concave lenses, and the third sub lens unit is composed of one nor more convex lenses and,
    the zoom lens satisfies the following condition:

$$-0.6 < \frac{\frac{\phi_{11}}{\nu_{11}}}{\frac{\phi_{13}}{\nu_{13}}} \times \left(\frac{h_{11T}}{h_{13T}}\right)^2 < -0.5,$$

where $\phi_{11}$ is the refractive power of the first sub lens unit, $\phi_{13}$ is the refractive power of the third sub lens unit, $\nu_{11}$ is the average Abbe constant of the first sub lens unit, $\nu_{13}$ is the average Abbe constant of the third sub lens unit, $h_{11T}$ is the paraxial converted beam height of the first sub lens unit at the telephoto end, and $h_{13T}$ is the paraxial converted beam height of the third sub lens unit at the telephoto end.

2. A zoom lens according to claim 1, wherein the zoom lens satisfies the following condition:

$$0.20 < \frac{\phi_{12}}{\phi_1} < 0.30,$$

where $\phi_1$ is the refractive power of the first lens unit, and $\phi_{12}$ is the refractive power of the second sub lens unit.

3. A zoom lens according to claim 1, wherein the zoom lens satisfies the following condition:

$$1.1 < \frac{fw}{hgt} < 1.5,$$

where fw is the focal length of the zoom lens at the wide angle end, and hgt is the maximum image height.

4. An image pickup apparatus comprising:
    a zoom lens comprising, in order from the object side to the image side:
    a first lens unit having positive refractive power;
    a zoom lens group constituted by at least two lens units that move during zooming; and
    a last lens unit disposed on the most image side that does not move for zooming, wherein the first lens unit includes a first sub lens unit having negative refractive power that does not move for focusing, a second sub lens unit that moves during focusing, and a third sub lens unit having positive refractive power that does not move for focusing,
the first sub unit is composed of one or more concave lenses, and the third sub lens unit is composed of one nor more convex lenses and,
the zoom lens satisfies the following condition:

$$-0.6 < \frac{\frac{\phi_{11}}{\phi_{13}}}{\frac{v_{11}}{v_{13}}} \times \left(\frac{h_{11T}}{h_{13T}}\right)^2 < -0.5,$$

where $\phi_{11}$ is the refractive power of the first sub lens unit, $\phi_{13}$ is the refractive power of the third sub lens unit, $v_{11}$ is the average Abbe constant of the first sub lens unit, $v_{13}$ is the average Abbe constant of the third sub lens unit, $h_{11T}$ is the paraxial converted beam height of the first sub lens unit at the telephoto end, and $h_{13T}$ is the paraxial converted beam height of the third sub lens unit at the telephoto end; and
a camera apparatus having an image pickup element that receives light coming from an object through the zoom lens.

\* \* \* \* \*